United States Patent [19]

Mori et al.

[11] Patent Number: 5,942,136
[45] Date of Patent: Aug. 24, 1999

[54] LASER MARKING DEVICE

[75] Inventors: Akira Mori, Chigasaki; Hideaki Okubo, Hiratsuka; Yoshinori Saito, Kamakura; Misao Kato, Oyama, all of Japan

[73] Assignee: Komatsu Ltd., Tokyo, Japan

[21] Appl. No.: 08/894,923

[22] PCT Filed: Mar. 7, 1996

[86] PCT No.: PCT/JP96/00554

§ 371 Date: Sep. 3, 1997

§ 102(e) Date: Sep. 3, 1997

[87] PCT Pub. No.: WO96/27473

PCT Pub. Date: Sep. 12, 1994

[30] Foreign Application Priority Data

Mar. 7, 1995 [JP] Japan ...................... 7-47382

[51] Int. Cl.$^6$ .................................. B23K 26/00
[52] U.S. Cl. ...................... 219/121.68; 347/247
[58] Field of Search ............... 219/121.68, 121.69, 219/121.74; 349/2, 3, 4, 113; 347/247, 255, 256

[56] References Cited

U.S. PATENT DOCUMENTS 5,231,263  7/1993  Kuwabara et al. ............ 219/121.68
5,260,542  11/1993  Ishiguro et al. ............... 219/121.68
5,309,273  5/1994  Mori et al. ..................... 219/121.68
5,310,986  5/1994  Zumoto et al. ................ 219/121.68
5,490,003  2/1996  Van Sprang .................... 349/113
5,526,149  6/1996  Kanbe et al. .................... 349/113

FOREIGN PATENT DOCUMENTS 60-174671  2/1984  Japan .

*Primary Examiner*—Geoffrey S. Evans
*Attorney, Agent, or Firm*—Diller, Ramik & Wight, PC

[57] ABSTRACT

A laser marking device for forming the pattern printed on a liquid crystal mask on the surface of an object. In the laser marking device, an input optical system (20) and an output optical system (30) are positioned on the input surface side of a reflective liquid crystal element (5) on which the laser beam (L) is made to fall through the input optical system (20). The angle of incident of the laser beam (L) on the input surface of the element (5) is approximately 90°. The laser beam (L) reflected by the element (5) is directed to the object (15) through the optical system (30). A cooling means (17) which cools the element (5) is provided in contact with the surface of the element (5) opposite to the surface which the laser beam strikes. In such a way, the space for the optical systems (20) and (30) is reduced. The space occupied by the cooling means (17) is reduced and the cooling efficiency and cooling uniformity of the means (17) are improved because the means (17) is in direct contact with the element (5).

6 Claims, 3 Drawing Sheets

LASER MARKING DEVICE

TECHNICAL FIELD

The present invention relates to a laser marking device for marking a marking pattern of a liquid-crystal mask onto the surface of an object which is to be marked.

BACKGROUND ART

A laser marking device which employs laser beams as a light source and liquid-crystal elements as printing pattern masks has already been proposed in Japanese Patent Application Laid-open No.60-174671.

In laser marking devices of this kind, the incident face of a liquid-crystal mask is irradiated via an irradiating optical system with laser beams which have been generated by a laser light source. Laser beams which permeate the liquid-crystal mask are emitted from the face opposite to the incident face.

For this reason, it is sought to prevent the optical system comprising the incident and emitting optical systems from spreading spatially to the right and left. This is achieved either by locating the emitting optical system, which guides emitted laser beams on to the object which is to be marked, on the opposite side of the liquid-crystal mask to the incident optical system, or by employing a plurality of optical elements designed to deflect the light emitted from the liquid-crystal mask to the side on which the incident optical system is located.

Whichever of these methods was adopted, the optical system comprising the incident and emitting optical systems required a great deal of space in both the horizontal and vertical directions.

In particular, the method which employs a plurality of optical elements in order to deflect the light emitted from the liquid-crystal mask to the side on which the incident optical system is located requires mirrors, prisms and numerous other optical elements, with the result that it is costly.

Moreover, in order to prevent uneven marking it is necessary to ensure that the liquid-crystal mask is not marred by unevenness of temperature among the pixels of the liquid-crystal screen. In view of the fact that it takes longer to alter the liquid-crystal display if the temperature is too low, and the contrast deteriorates if it is too high, it is clear that there is an optimal temperature for the liquid-crystal mask. Consequently, the liquid crystal mask must be cooled so that the incident face is more even in temperature than the rear face, and so as to ensure that the optimal temperature is maintained.

In the case of conventional laser marking devices it has not been possible to locate a means of cooling in direct contact with the liquid-crystal mask face because they are configured in such a manner that the laser beam is incident on one face of the liquid-crystal mask, permeates it, and is emitted from the other face.

It has thus only been possible to cool it indirectly with a cooling fan or similar device using air as a medium. This method is problematic not only on account of the space required for the cooling device, but because of a lack of uniformity in cooling efficiency.

It is a first object of the present invention, which has been designed with these circumstances in mind, to save space for the optical system comprising the incident and emitting optical systems, and to lower costs by reducing the number of optical elements.

It is a second object of the present to make it possible for a means of cooling to be brought into direct contact with the liquid-crystal element, thus improving the efficiency and uniformity of cooling.

DISCLOSURE OF THE INVENTION

As has been explained above, it is a first object of the present invention to save space for the optical system comprising the incident and emitting optical systems, and to lower costs by reducing the number of optical elements. This first object is achieved by means of a first invention as described below.

In other words, the first invention is a laser marking device for marking printed patterns of a liquid-crystal mask onto the face of an object which is to be marked by irradiating the liquid-crystal mask via an incident optical system with a laser beam which has been generated by a laser light source, and guiding the laser beam which is emitted after permeating the liquid-crystal mask via an emitting optical system to the object which is to be marked, wherein a reflective liquid-crystal element is used as the liquid-crystal mask; and the incident optical system and the emitting optical system whereby the laser beam which is emitted after permeating the reflective liquid-crystal element is guided to the object which is to be marked are located on the incident face side of the reflective liquid-crystal element, in such a manner that the optical axis of the laser beam which is incident upon the reflective liquid-crystal element by way of the incident optical system is roughly vertical in relation to the incident face of the reflective liquid-crystal element.

As FIG. 1 shows, the configuration of the first invention locates both the incident optical system 20 and the emitting optical system 30 on the side of that face of the reflective liquid-crystal element 5 on which the laser beam L is incident. In addition, it allows the laser beam L to be incident via the incident optical system 20 upon the reflective liquid-crystal element 5 in such a manner that the optical axis of the laser beam L is roughly vertical in relation to the incident face of the reflective liquid-crystal element 5. Having been reflected by the reflective liquid-crystal element 5, the laser beam L is guided to the object which is to be marked 15.

In this way, it is possible to inhibit the spatial expansion of the optical system in the right-and-left direction because the incident optical system 20 and the emitting optical system 30 are located en masse on the incident face side of the reflective liquid-crystal element 5. It is also possible to inhibit the spatial expansion of the optical system in the up-and-down direction because the optical system is located in such a manner that the optical Axis of the laser beam L is roughly vertical in relation to the incident face of the reflective liquid-crystal element 5.

It is a second object of the present invention to make it possible to bring a means of cooling into direct contact with the liquid-crystal element, thus conserving space and improving efficiency and uniformity of cooling.

This second object is achieved by means of a second invention as described below.

In other words, the second invention is a laser marking device configured as described in the first invention, wherein a means of cooling the reflective liquid-crystal element is located in contact with the opposite face of the reflective liquid-crystal element to the incident face.

As FIG. 1 shows, the configuration of the second invention locates both the incident optical system 20 and the emitting optical system 30 concentratedly on the incident face side of the reflective liquid-crystal element 5, so that no optical elements are any longer located on the side of the opposite face of the reflective liquid-crystal element 5 to the incident face. It therefore becomes possible to bring a coling means 17 for cooling the reflective liquid-crystal element 5 into contact with the opposite face of the reflective liquid-crystal element 5 to the incident face.

BEST MODE FOR CARRYING OUT THE INVENTION

There follows, with reference to the attached drawings, a detailed description of an embodiment of the laser marking device to which the present invention pertains.

Figure 1:
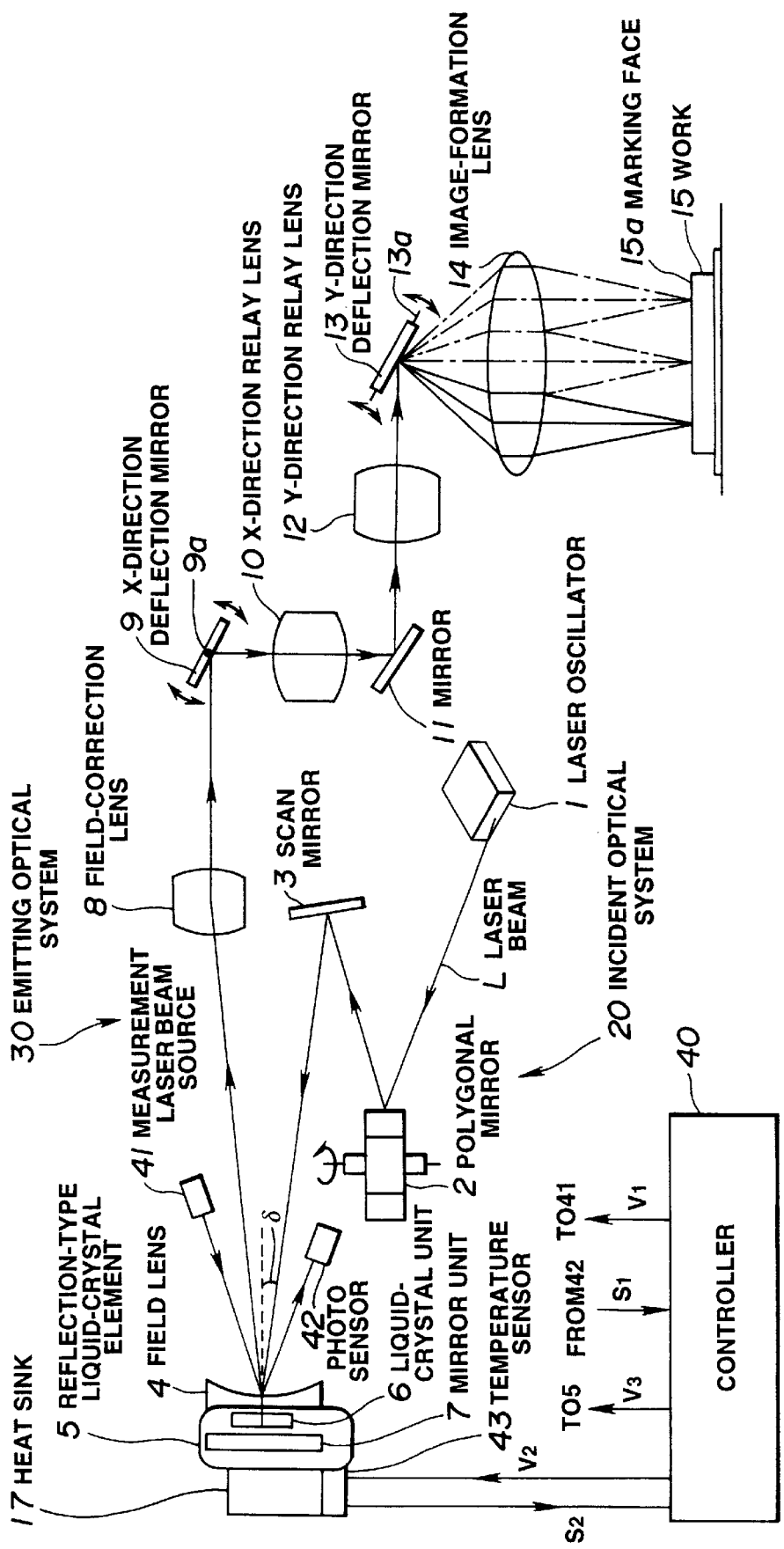
FIG. 1 illustrates the configuration of an embodiment of the laser marking device to which the present invention pertains.

As FIG. 1 shows, the laser marking device to which the embodiment refers comprises in the main a reflective liquid-crystal element 5, being a liquid-crystal mask for displaying a printed pattern which is to be marked, an incident optical system 20 which causes a laser beam L generated by a YAG laser oscillator 1 with a Q switch to be incident upon the incident face of the reflective liquid-crystal element 5 at an inclination of a prescribed minute angle δ to a vertical axis of the incident face, and an emitting optical system 30 whereby the laser beam L reflected by the reflective liquid-crystal element 5 is made to irradiate a marking face 15a of an object 15 which is to be marked.

In other words, what happens first is that data on the original image which is to be marked on to the marking face 15a of the work 15 is relayed from an external CPU (higher computer) to an internal control unit of the laser marking device, and stored in a memory. That is to say, the internal control unit stores a code number which refers to the original image fed from the external CPU.

The YAG laser oscillator 1 is switched on when an oscillation start button of the control panel is pressed, and it begins oscillating continuously. The laser beam L is not directed on to the reflective liquid-crystal element 5 unless the Q switch is in operation.

An example of the reflective liquid-crystal element 5 is a high-molecular complex liquid crystal, each pixel (dot) of the liquid crystal being driven by electrical voltage.

In other words, the liquid crystal 5 has the property to reflect light in the part of the pixels (dots) to which voltage has been imparted, and scatter the light in the part of the pixels to which no voltage has been imparted so as not to reflect the light. There may be cases where each pixel of the liquid crystal 5 is driven in a time division manner or is static-driven.

The reflective liquid-crystal element 5 comprises a liquid-crystal unit 6 and a mirror unit 7. Light is reflected by the mirror unit 7. The internal configuration of the reflective liquid-crystal unit 5 will be described later.

When the marking start button is depressed, a motor which drives a polygonal mirror 2 and a scanning mirror 3 is driven to its initial position by the internal control unit, and the initial setting of the motor and the initial setting of the reflective liquid-crystal element 5 are performed. While the initial settings are being performed, processing is implemented by the internal control unit whereby the original image stored in the abovementioned memory is partitioned, and printing pattern data for the partitioned image which is to be displayed is fed to the reflective liquid-crystal element 5.

In other words, the internal control unit implements the process of converting the code numbers which represent the original image into code numbers for each of the partitioned images, further converting these code numbers into an electrode applied signal to be applied to the electrodes of the reflective liquid-crystal element 5. This signal is imparted to the reflective liquid-crystal element 5.

Once the initial setting of the motor and the reflective liquid-crystal element 5 has been completed, the reflective liquid-crystal element 5 is switched on, and each pixel of the reflective liquid-crystal element 5 is driven by the electrode applied signals imparted to the reflective-type liquid-crystal element in the time division manner and the partitioned image is displayed on the reflective liquid-crystal element 5. The motor is driven, and scanning of the reflective liquid-crystal element 5 commences.

Once the reflectivity of the displayed and non-displayed pixels of the reflective liquid-crystal element 5 has stabilized, the internal control unit imparts a trigger signal to the Q switch of the YAG laser oscillator 1. The YAG laser oscillator 1 begins to generate pulses at a pre-set frequency, causing the laser beam L to irradiate the incident face of the reflective liquid-crystal element 5.

In other words, the laser beam L which is output from the YAG laser oscillator 1 is pinpointed on to the incident face of the reflective liquid-crystal element 5 by way of the polygon mirror 2, scanner mirror 3 and a wide-diameter field lens 4 which is located directly in front of the incident face of the reflective liquid-crystal element 5. The field lens 4 is an optical element which serves to render the optical axis of the incident laser beam L vertical in relation to the incident face of the reflective liquid-crystal element 5.

The internal control unit controls the rotation of the polygonal mirror 2 and scan mirror 3, and raster-scans in order to ensure that the laser beam L irradiates all parts of the pixels in the reflective liquid-crystal element 5.

The laser beam L reflected by a mirror unit 7 of the reflective liquid-crystal element 5 is emitted from the field lens 4 with an emitting optical axis which is symmetrical with the incident optical axis in relation to the vertical axis of the reflective liquid-crystal element 5. The emitted laser beam L is guided through a field-correction lens 8 in order to correct the distortion caused by the field lens 4, then through a mirror 9 which serves to deflect it in the X direction, an X-direction relay lens 10, a mirror 11, a Y-direction relay lens 12, a mirror 13 which serves to deflect it in the Y direction, and an image-formation lens 14 to the marking face 15a of the work 15, where a printed pattern of the partitioned image (similar in shape to the printed pattern which was displayed by the reflective liquid-crystal element 5) is marked.

When marking of one partitioned image pattern is complete, initial setting of the motor and reflective liquid-crystal element 5 is performed in the same way as described above in preparation for marking the next partitioned image.

Marking pattern data for the next partitioned image which is to be displayed is fed to the reflective liquid-crystal element 5, and is marked on to the marking face 15a of the work 15 by raster-scanning the reflective liquid-crystal element 5 in the same way.

When proceeding from the marking of the printed pattern of one partitioned image to that of another, the rotational axis 9a of the mirror 9 which serves to deflect the beam in the X direction and the rotational axis 13a of the mirror 13 which serves to deflect it in the Y direction are driven a certain distance, as shown by the arrows, in accordance with the position in which the next partitioned image printed pattern is to be printed.

Thus, printed patterns of the partitioned image are marked one by one in the corresponding coordinate positions (X, Y) on to the two-dimensional X-Y plane of the marking face 15a of the work 15, so that ultimately a printed pattern of the original image is marked.

The Q switch of the YAG laser oscillator 1 continues to operate once it has been initiated, thus providing continuous laser-beam irradiation of the reflective liquid-crystal element 5.

Figure 2:
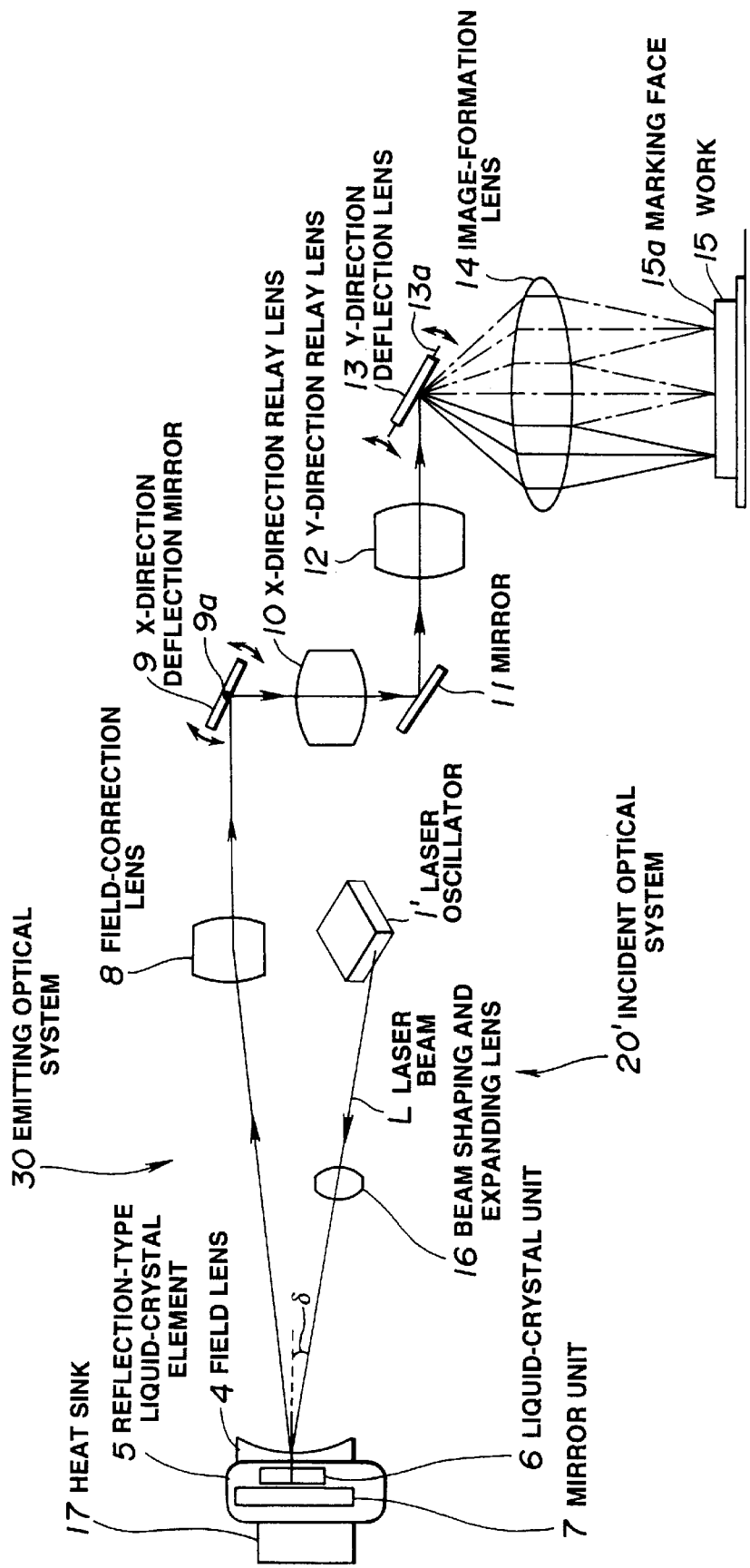
FIG. 2 illustrates another embodiment.

With reference to FIG. 2, there now follows a description of an embodiment without scanning on the surface of the liquid crystal. Codes which are the same as those in FIG. 1 represent the same functions, and an explanation of them will be omitted here. Only the points of difference will be described.

In the incident optical system 20' illustrated in FIG. 2, the place of an optical element for scanning the laser beam L is taken by a lens 16 which serves to shape and expand the cross-section of a laser beam L generated by a pulse-type laser oscillator 1' in accordance with the incident face of the reflective liquid-crystal element 5.

Having passed through this lens 16, the laser beam L is incident on the whole of the incident face of the reflective liquid-crystal element 5, and all the pixel is irradiated en bloc.

Since the printed patterns of each partitioned image are displayed one after another on the reflective liquid-crystal element 5, and whole pixels are irradiated en bloc, marking is implemented without the need for scanning by partitioned image as required in the embodiment illustrated in FIG. 1.

In the embodiments illustrated in both FIG. 1 and FIG. 2 provision is made for a field-correction lens 8 to correct the field lens 4, but this may be omitted if distortion presents no problem.

Similarly, in the embodiments illustrated in both FIG. 1 and FIG. 2 provision is made for a field lens 4, but this itself may be omitted if no problem is presented by the laser beam L not being vertically incident on the incident face of the reflective liquid-crystal element 5.

In this way, the embodiments illustrated in FIGS. 1 and 2 make it possible to inhibit the spatial expansion of the optical system in the horizontal direction by locating the incident optical system 20 or 20' and the emitting optical system 30 en masse on the incident face side of the reflective liquid-crystal element 5. They also make it possible to inhibit the spatial expansion of the optical system in the vertical direction by locating it in such a manner that the optical axis of the laser beam L is roughly vertical in relation to the incident face of the reflective liquid-crystal element 5.

Moreover, the fact that the reflective liquid-crystal element 5 itself has the function of causing the incident laser beam L to be reflected in the original direction means that there is no longer any need for the separate provision of an optical element designed to deflect the incident laser beam L in the original direction, thus reducing costs.

Thus, the abovementioned embodiments permit conservation of space and reduction of cost of the optical system.

Moreover, the fact that in the embodiments illustrated in FIGS. 1 and 2 the incident optical system 20 or 20' and the emitting optical system 30 are located en masse on the incident face side of the reflective liquid-crystal element 5 means that there are no longer any optical elements located on the opposite face. This makes it possible to locate a means of cooling 17 (eg a heat sink or Peltier cooling element) in contact the face on the opposite side of the reflective liquid-crystal element 5 from the incident face.

The fact that it is possible to employ a contact-type means of cooling 17 not only makes it possible to conserve space, but represents a considerable improvement in terms of efficient and uniform cooling.

It is also necessary to control the reflective liquid-crystal element 5 so as to maintain it at the prescribed optimal temperature.

Moreover, with a view to stabilizing the print quality, it is necessary for the reflectivity of the reflective liquid-crystal element 5 to be maintained at the prescribed value.

In FIG. 1, a controller 40 is provided in order to execute this kind of control.

In other words, a laser beam from a laser beam source 41 is incident upon the incident face of the reflective liquid-crystal element 5 for the purpose of measurement. This laser beam is reflected by the reflective liquid-crystal element 5 and detected by a photosensor 42.

The controller 40 imparts a drive command signal V1 to the laser beam source 41 in order to ensure that the laser beam generated by the laser beam source 41 is always of a constant power. The photosensor 41 detects the power of the reflected laser beam, and a detection signal S1 is input into the controller 40.

The controller 40 measures the degree of reflectivity from the size of the detection signal S1. If the reflectivity is found to be too low, it imparts a drive command signal V3 to the reflective liquid-crystal element 5, so that its drive voltage can be increased, thus improving the reflectivity. If on the other hand the reflectivity is found to be too high, a drive command signal V3 is imparted to the reflective liquid-crystal element 5, so that its drive voltage can be decreased, thus reducing the reflectivity. In this way the reflectivity of the reflective liquid-crystal element 5 is maintained at the prescribed target level.

Temperature control is implemented by means of a temperature sensor 43 which is located on the opposite side of the reflective liquid-crystal element 5 to the incident face. This temperature sensor 43 detects the temperature S2 of the liquid crystal, which is then input into the controller 40. The controller 40 outputs a drive command signal V2 to the means of cooling 17 and controls temperature feedback, using the temperature S2 detected by the above-mentioned temperature sensor 43 as the degree of feedback to attain the prescribed target temperature.

The same control process is also present in FIG. 2, although it is not shown.

In the embodiments it has been assumed that the lasers are YAG lasers, but this does not mean that they are restricted to these, and it is also possible to utilize semiconductor lasers, argon lasers and other types of laser.

In the embodiments it has also been assumed that the liquid crystal element which is used as the reflective liquid-crystal element is such that increasing the drive voltage will improve its reflectivity, but this does not mean that it is restricted in this way, and it is also possible to use one where decreasing the drive voltage has that effect.

Figure 3:
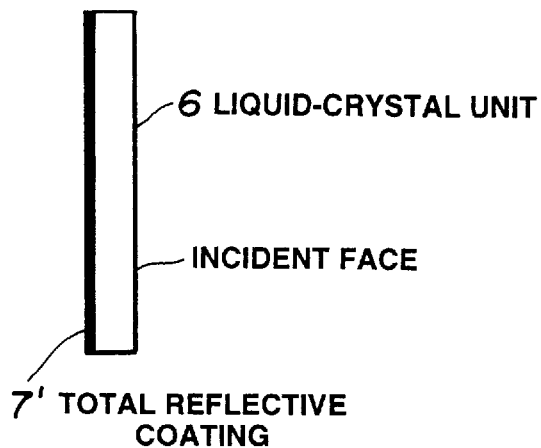
FIG. 3 shows the configuration of a reflective liquid-crystal element which is used in the embodiments illustrated in FIGS. 1 and 2.
Figure 4A:
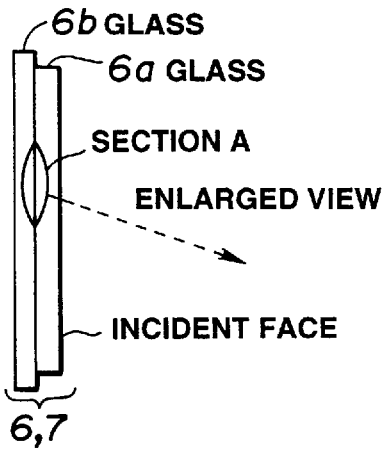
FIG. 4 (a) shows the configuration of a reflective liquid-crystal element which is used in the embodiments illustrated in FIGS. 1 and 2, while FIG. 4 (b) is an enlarged drawing of section A of FIG. 4 (a)
Figure 4B:
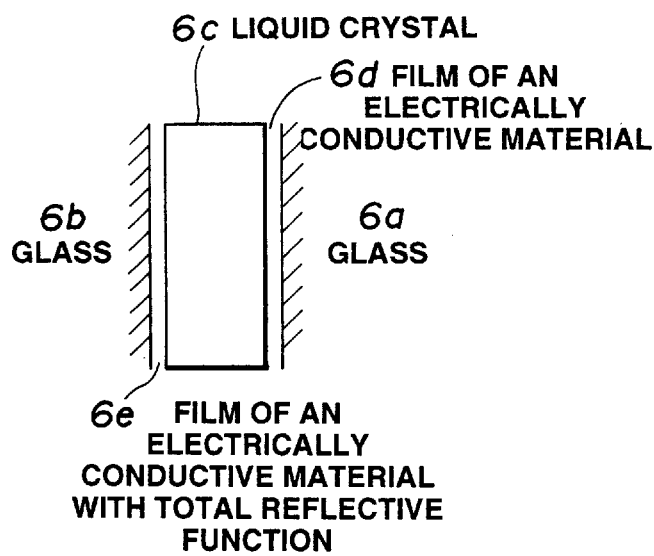
Figure 5:
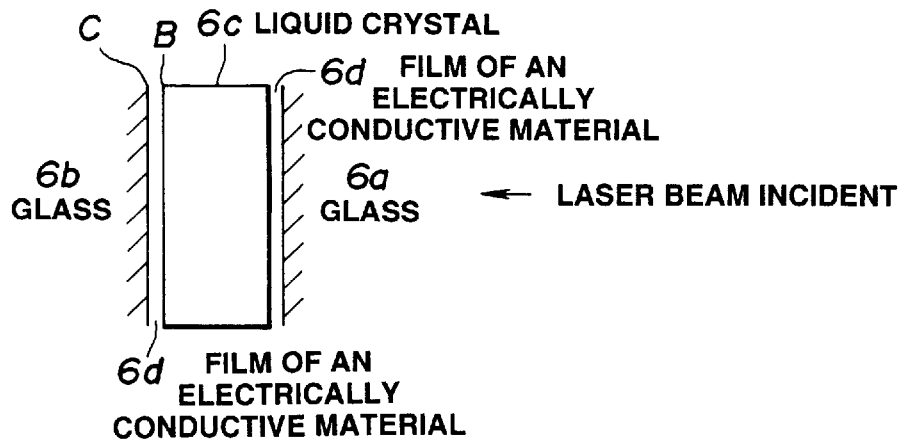
FIG. 5 shows the configuration of a reflective liquid-crystal element which is used in the embodiments illustrated in FIGS. 1 and 2.

There now follows a description of the internal structure of the reflective liquid-crystal element 5 with reference to FIGS. 3, 4 and 5.

In FIG. 3, the whole of the face on the opposite side to the incident face of the liquid-crystal unit 6 is has been given a reflective coating 7', consisting of a single layer of film or a plurality of layers of laminated film. This reflective coating 7' allows the laser beam L to be reflected.

An example of a material which may be used for this reflective coating is metal film, but it is also possible to employ other substances as desired, provided that they have the property of reflecting incident laser beams. By selecting the prescribed thickness it is also possible to use transparent films which have the property of reflecting incident laser beams.

In FIG. 4 (a), the reflective liquid-crystal element 5 is configured in such a manner that a liquid crystal is sandwiched between two sheets of glass 6a, 6b. That is to say, the enlarged section A shown in FIG. 4 (b) is configured in such a manner as to give, in order from the side on which the laser beam is incident, a sheet of glass 6a, a film comprising an electrically conductive material 6d, a liquid crystal 6c, a film comprising an electrically conductive material with total reflective function 6e, and a sheet of glass 6b. Here, the laser beam L is caused to be reflected by imparting a total reflective function to the film comprising an electrically conductive material 6e. This function can be achieved, for instance, by selecting a prescribed thickness of film. FIG. 5 shows a reflective liquid-crystal element 5 wherein a liquid crystal is sandwiched in the same way between two sheets of glass 6a, 6b.

In this case, the interface B between the liquid crystal 6c and the film of electrically conductive material 6d on the side opposite to that on which the laser beam is incident, or the interface C between the same film of electrically conductive material 6d and the glass 6d has been given a reflective coating consisting of a single layer of film or a plurality of layers of laminated film. These sections with reflective coating B, C allow the laser beam L to be reflected.

An example of a material which may be used for this reflective costing is metal film, but it is also possible to employ other substances as desired, provided that they have the property of reflecting incident laser beams. By selecting the prescribed, thickness it is also possible to use transparent films which have the property of reflecting incident laser beams.

As has been explained above, the present invention makes it possible to conserve space in the incident and emitting optical systems in a laser marking device. It also allows costs to be reduced because there is no need for an optical element in order to deflect the laser beam.

Moreover, it becomes possible to locate a means of cooling in contact with the opposite face of the reflective liquid-crystal element to the incident face, thus making it possible not only to conserve the space required for providing a means of cooling, but considerably improving the efficacy and uniformity of cooling.

We claim:

1. A laser marking device for marking printed patterns of a liquid-crystal mask on to a surface of an objection which is to be marked by irradiating the liquid-crystal mask via an incident optical system with a laser beam which has been generated by a laser light source, and guiding the laser beam which is emitted after permeating the liquid-crystal mask via an emitting optical system to the object which is to be marked, wherein a reflective liquid-crystal element is used as the liquid-crystal mask; and the incident optical system and the emitting optical system whereby the laser beam which is emitted after permeating the reflective liquid-crystal element is guided to the object which is to be marked are located on an incident face side of the reflective liquid-crystal element, in such a manner that an optical axis of the laser beam which is incident upon the reflective liquid-crystal element by the incident optical system is roughly vertical in relation to the incident face of the reflective liquid-crystal element.

2. The laser marking device as described in claim 1, wherein means of cooling the reflective liquid-crystal element is located in contact with an opposite face of the reflective liquid-crystal element to the incident face.

3. The laser marking device as described in claim 1, wherein the reflective liquid-crystal element is a high-molecular complex liquid crystal.

4. The laser marking device as described in claim 1, wherein the reflective liquid-crystal element is structured by applying a total reflective coating to an opposite face of the liquid-crystal element to the incident face.

5. The laser marking device as described in claim 1, wherein the reflective liquid-crystal element is structured by endowing a film of electrically conductive material which constitutes the liquid-crystal element with a function whereby it reflects the laser beam.

6. The laser marking device as described in claim 1, wherein the reflective liquid-crystal element is structured by having a laser beam reflective film located in contact with a film of electrically conductive material which constitutes the liquid-crystal element.

* * * * *